UNITED STATES PATENT OFFICE.

FRANCIS BASCHNAGEL, OF WENHAM, ASSIGNOR TO BEVERLY RUBBER COMPANY, OF BEVERLY, MASSACHUSETTS.

IMPROVEMENT IN RESTORING WASTE RUBBER.

Specification forming part of Letters Patent No. 23,805, dated April 26, 1859.

*To all whom it may concern:*

Be it known that I, FRANCIS BASCHNAGEL, of the town of Wenham, in the county of Essex, in the State of Massachusetts, have invented a new and useful Process of Restoring Waste Vulcanized or Hard India-Rubber—that is to say, such rubber which, having been once cured or prepared by any of the processes granted by the United States to Charles Goodyear, or any other process applied for similar purposes, has by any reason become waste or useless, or, having been manufactured into car-springs, shoes, packing, canes, and other substances and fabrics, has served or been deemed to have served its purpose or otherwise become unfit for the purposes of use, wearing, trade or commerce—to such a soft, plastic, or gummy state that it may be used again in the manufacture of india-rubber fabrics and substances; and I do hereby declare that the following is a full and exact specification of said improvement.

I grind the waste vulcanized rubber between fluted or scored rollers, or what are known as "mullers," or otherwise divide the same, until it is reduced to a finely-divided state, and then submit the same to the operation of steam, in a room, box, boiler, or any vessel suited to the purpose, from six to twenty-four hours. The lenth of time for which the rubber has to be submitted to such operation of steam partly depends upon the more or less finely-divided state of the rubber so submitted, partly upon the degree of stickiness or elasticity desired or required, and partly upon the degree of heat contained in the steam. In regard to the latter, the heat contained in the steam at the time of its formation by boiling water is sufficient, but may be increased to any degree without endangering the rubber. The degree of heat contained in the steam applied by me generally during my experiments was from 300° to 400° Fahrenheit; and I found that if the rubber was finely ground and exposed to such steam for about eighteen hours a good and sufficient result was obtained. The vessel used by me during my experiments was an iron box or boiler which could be opened on the side, and into which the steam was introduced by means of a pipe inserted on the top, while a small hole at the bottom served to let out the waste steam after it had passed through the rubber, or any water formed by the steam.

By being submitted to the operation of steam, as above described, the waste rubber becomes reduced to a plastic or gummy state, so that it may be used again in the manufacture of india-rubber fabrics, and after being removed from the vessel wherein the same was exposed to the steam it is ground between rollers until it is reduced to a finely-divided state, and then dried in a drying-room until it is free from water, when it may be used again, like new vulcanized rubber.

What I claim, now, as my invention is the above-described process, to wit:

Restoring waste vulcanized rubber by reducing the same, by grinding or otherwise, to a finely-divided state, and then submitting the same in a suitable vessel to the direct action of steam.

FRANCIS BASCHNAGEL.

In presence of—
FRANCIS P. SWEET,
WILLIAM W. MEGRONIGLE.